(No Model.)

T. H. HOYT & J. GILLET.
MEANS FOR ATTACHING CRANK ARMS TO CRANK SHAFTS.

No. 603,692. Patented May 10, 1898.

Witnesses.
O. N. Keeney
Anna V. Faust

Inventors.
Thomas H. Hoyt
Joseph Gillet
By Benedict and Morsell
Attorneys.

UNITED STATES PATENT OFFICE.

THOMAS H. HOYT AND JOSEPH GILLET, OF MILWAUKEE, WISCONSIN, ASSIGNORS TO THE MILWAUKEE MANUFACTURING COMPANY, OF SAME PLACE.

MEANS FOR ATTACHING CRANK-ARMS TO CRANK-SHAFTS.

SPECIFICATION forming part of Letters Patent No. 603,692, dated May 10, 1898.

Application filed June 21, 1897. Serial No. 641,542. (No model.)

*To all whom it may concern:*

Be it known that we, THOMAS H. HOYT and JOSEPH GILLET, of Milwaukee, in the county of Milwaukee and State of Wisconsin, have invented a new and useful Improvement in Means for Attaching Crank-Arms to Crank-Shafts, of which the following is a description, reference being had to the accompanying drawings, which are a part of this specification.

Our invention has relation to improvements in means for attaching crank-arms to crank-shafts, more especially intended for use in attaching crank-arms to the crank-shafts of bicycles.

The object of the invention is to provide a simple combination and arrangement for obtaining the object desired, whereby means are afforded for readily tightening the cranks and for removing the same when necessary.

With the above primary ends in view the invention consists of the devices and parts or their equivalents, as hereinafter more fully set forth.

Figure 1:
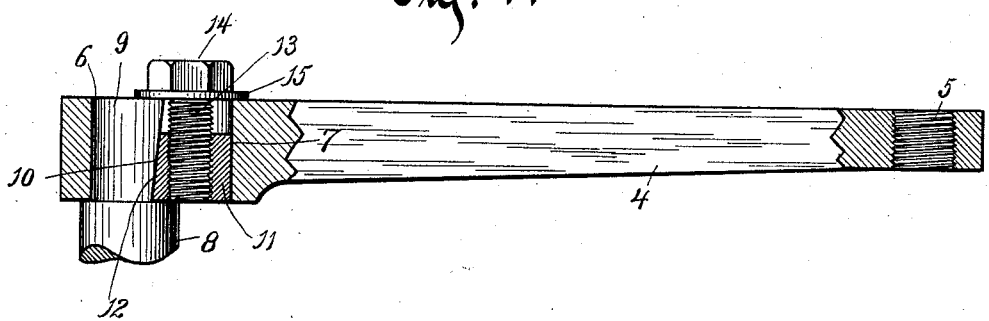
Figure 2:
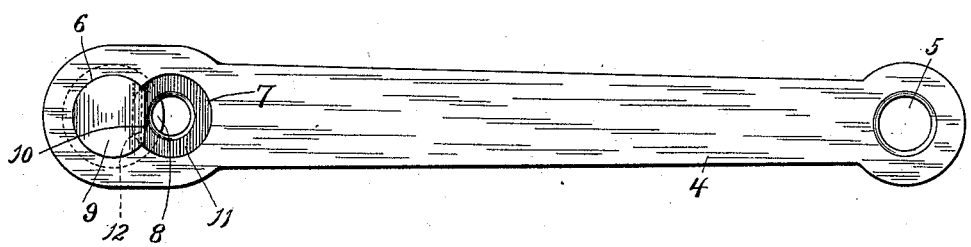
Figure 3:
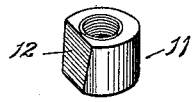

In the accompanying drawings, Figure 1 is a plan view of a bicycle crank-arm and a fragment of the crank-shaft, parts being broken away. Fig. 2 is an elevation, and Fig. 3 is a detail view, of the wedging-nut.

Referring to the drawings, the numeral 4 indicates a bicycle crank-arm provided at its outer end with the usual screw-threaded opening 5 for the attachment of the treadle. At its inner end the crank-arm is provided with an opening 6, which opens into or communicates with another and preferably smaller opening 7, advisably in longitudinal alinement therewith.

The numeral 8 indicates the crank-shaft, which is provided with the reduced end journal 9, which fits in the opening 6 of the crank-arm. The side of this end journal which is adjacent to the opening 7 when the crank-arm is in place is flat and beveled, as indicated at 10.

Adapted to fit in the opening 7 is a wedging-nut 11. The wedging effect is obtained by forming one side of said nut with a flat and beveled surface 12. The nut is placed within the opening 7 so that this flat and beveled surface will register and contact with the corresponding flat and beveled surface of the end journal 9 of the crank-shaft. A screw-bolt 13 is adapted to engage the interior threads of the nut, and this screw-bolt is provided at its outer end with a hexagonal or many-sided head 14. Interposed between this head and the crank is a washer 15.

From the above description the construction, operation, and advantages of our improvements, it is thought, will be readily understood.

After the parts are adjusted together, as shown in Fig. 1, if it is desired to tighten the crank-arm the head of the screw-bolt is engaged by a wrench or other suitable tool and said bolt thereby turned in a direction to draw the wedging-nut outwardly, whereby the flat beveled surface of the nut will be wedged tightly against the corresponding surface of the shaft. If it is desired to remove the screw-bolt for the purpose of disassembling the parts, said bolt is turned in the opposite direction. In this instance the wedging-nut will remain stationary and the screw will travel outwardly until entirely disengaged from the nut.

It will be obvious that our attaching mechanism is not only simple in construction, but furthermore provides for most conveniently and expeditiously tightening and removing the crank-arm merely by the application of a wrench to the head of the screw-bolt.

What we claim as our invention is—

In means for attaching crank-arms to crank-shafts, the combination, of a crank-shaft having the end thereof provided with a flat beveled side, a crank-arm provided with an opening to receive the end of the crank-shaft, and with another branching opening in communication, and in longitudinal alinement, with the first-named opening, a nut fitting said branching opening, said nut provided with a beveled side registering with and engaging the flat beveled side of the end of the crank-shaft, and a screw-bolt passing into the branching opening of the crank-arm to engage the threads of the nut, said bolt being in longitudinal alinement with the crank-shaft.

In testimony whereof we affix our signatures in presence of two witnesses.

THOMAS H. HOYT.
JOSEPH GILLET.

Witnesses:
ANNA V. FAUST,
ARTHUR L. MORSELL.